(12) United States Patent
Shen

(10) Patent No.: US 11,356,230 B2
(45) Date of Patent: Jun. 7, 2022

(54) CHANNEL TRANSMISSION METHODS AND DEVICE

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 49 days.

(21) Appl. No.: 16/985,378

(22) Filed: Aug. 5, 2020

(65) Prior Publication Data

US 2020/0366453 A1    Nov. 19, 2020

Related U.S. Application Data

(63) Continuation of application No. PCT/CN2018/075865, filed on Feb. 8, 2018.

(51) Int. Cl.
*H04L 5/00* (2006.01)
*H04W 72/04* (2009.01)
(Continued)

(52) U.S. Cl.
CPC .......... *H04L 5/0092* (2013.01); *H04L 5/0044* (2013.01); *H04L 5/0078* (2013.01);
(Continued)

(58) Field of Classification Search
CPC ... H04L 5/0092; H04L 5/0098; H04L 5/0044; H04L 5/0078; H04W 72/042; H04W 72/0453; H04W 80/02; H04W 72/12; H04W 36/06; H04W 72/0493; H04W 72/1289

See application file for complete search history.

(56) References Cited

U.S. PATENT DOCUMENTS

| | | | |
|---|---|---|---|
| 2019/0045571 A1* | 2/2019 | Wu | ....................... H04L 5/0048 |
| 2020/0229152 A1 | 7/2020 | Park | |
| 2021/0092717 A1* | 3/2021 | Takeda | .................. H04W 72/04 |

FOREIGN PATENT DOCUMENTS

| | | |
|---|---|---|
| EP | 2151954 A1 | 2/2010 |
| KR | 20170134238 A | 12/2017 |

OTHER PUBLICATIONS

English translation of the Written Opinion of the International Search Authority in the international application No. PCT/CN2018/075865, dated May 30, 2018.
(Continued)

*Primary Examiner* — Omar J Ghowrwal

(57) ABSTRACT

Disclosed in the present invention are a channel transmission method and device. The method includes that: a terminal determines transmission time corresponding to a first channel as a first moment, wherein a Band Width Part (BWP) activated by the terminal presently is a first BWP; the terminal receives first control information from a network device, wherein the first control information includes first indication information, and the first indication information is to indicate that a to-be-activated BWP is a second BWP; and the terminal transmits no first channel at the first moment when the first BWP and the second BWP meet a predetermined rule.

16 Claims, 5 Drawing Sheets

A terminal determines transmission time corresponding to a first channel as a first moment, a BWP activated by the terminal presently being a first BWP — 201

The terminal receives first control information from a network device, the first control information including first indication information, and the first indication information being to indicate that a to-be-activated BWP is a second BWP — 202

The terminal does not transmit the first channel at the first moment when the first BWP and the second BWP meet a predetermined rule — 203

(51) Int. Cl.
H04W 80/02 (2009.01)
H04W 72/12 (2009.01)
H04W 36/06 (2009.01)
(52) U.S. Cl.
CPC .......... *H04L 5/0098* (2013.01); *H04W 36/06* (2013.01); *H04W 72/042* (2013.01); *H04W 72/0453* (2013.01); *H04W 72/0493* (2013.01); *H04W 72/12* (2013.01); *H04W 72/1289* (2013.01); *H04W 80/02* (2013.01)

(56) References Cited

OTHER PUBLICATIONS

3GPP TS 38.213 V15.0.0 (Dec. 2017), 3rd Generation Partnership Project;Technical Specification Group Radio Access Network;NR; Physical layer procedures for control (Release 15).
Supplementary European Search Report in the European application No. 18904666.7, dated Nov. 10, 2020.
3GPP TSG RAN WG1 Meeting NR#3, R1-1715892, LG Electronics, "Discussion on carrier aggregation and bandwidth parts", mailed on Sep. 17, 2017.
3GPP TSG RAN WG1 Meeting AH 1801, R1-1800384, LG Electronics, "Remaining issues on bandwidth part operation", mailed on Jan. 13, 2018.
3GPP TSG-RAN WG2 NR 2018AH#1 Meeting, R2-1801465, Samsung, "Further considerations for bandwidth part", mailed on Jan. 12, 2018.
3GPP TSG RAN WG1 #91, R1-1720693, Qualcomm Incorporated, "Open Issues on BWP", mailed on Nov. 18, 2017.
Intel Corporation. "On BWP Switching Delay", R4-1800117, 3GPP TSG-RAN WG4 Adhoc Meeting #1801., Jan. 26, 2018 (Jan. 26, 2018), pp. 1-6, from the Internet http://www.3gpp.org/ftp/tsg_ran/wg4_radio/TSGR4_AHs/TSGR4_AH-1801/Docs/R4-1800117.zip.
Nokia, Nokia Shanghai Bell. "On BWP Switching Delay", R4-1800742, 3GPP TSG-RAN WG4 AH 1801., Jan. 26, 2018 (Jan. 26, 2018), pp. 1-4, from the Internet http://www.3gpp.org/ftp/tsg_ran/wg4_radio/TSGR4_AHs/TSGR4_AH-1801/Docs/R4-1800742.zip.
International Search Report in the international application No. PCT/CN2018/075865, dated May 30, 2018.
Huawei et al: "Remaining issues on bandwidth part", 3GPP Draft; R1-1717077, XP051340268.
First Office Action of the European application No. 18904666.7, dated Jan. 17, 2022.

* cited by examiner

CHANNEL TRANSMISSION METHODS AND DEVICE

CROSS-REFERENCE TO RELATED APPLICATION

This application is a U.S. continuation application of International Application No. PCT/CN2018/075865, entitled "CHANNEL TRANSMISSION METHOD AND DEVICE, AND COMPUTER STORAGE MEDIUM", filed on Feb. 8, 2018, the disclosure of which is hereby incorporated by reference in its entirety.

BACKGROUND

In a Long Term Evolution (LTE) system, a frequency domain resource for a terminal is allocated in a whole system bandwidth. As the system bandwidth is greatly improved in a 5th Generation (5G) New Radio (NR) system, it is possible that a transmission bandwidth of the terminal takes up only a part of the system bandwidth.

In a current research of 5G NR, it has been decided to introduce a concept of a Band Width Part (BWP) to implement the allocation of the frequency domain resource within a range smaller than the system bandwidth. A base station may configure multiple BWPs via Radio Resource Control (RRC) signaling, and then dynamically activate a certain BWP in Downlink Control Information (DCI). Each BWP is based on a respective numerology, and the numerology includes subcarrier spacing and a Cyclic Prefix (CP). According to current solutions, only one BWP can be activated for one terminal; and while a new BWP is activated, the previous BWP will be deactivated.

As shown in FIG. 1, when the BWP1 is in an activated status, if the BWP2 is activated, the BWP1 will be deactivated. If the BWP1 is activated, the BWP2 will be deactivated. If the BWP1 is time-expired, it will fall back to a default BWP.

SUMMARY

Embodiments of the disclosure provide a channel transmission method and device.

A channel transmission method provided by the embodiments of the disclosure includes the following operations.

A terminal determines transmission time corresponding to a first channel as a first moment. A BWP activated by the terminal presently is a first BWP.

The terminal receives first control information from a network device. The first control information includes first indication information, and the first indication information is to indicate that a to-be-activated BWP is a second BWP.

The terminal does not transmit the first channel at the first moment when the first BWP and the second BWP meet a predetermined rule.

A channel transmission method provided by the embodiments of the disclosure includes the following operation.

A network device transmits first control information to a terminal. A BWP activated by the terminal presently is a first BWP. The first control information includes first indication information, and the first indication information is to indicate that a to-be-activated BWP is a second BWP. The first control information is used by the terminal to determine that the first BWP and the second BWP meet a predetermined rule, such that the terminal does not transmit a first channel at a first moment.

A channel transmission device provided by the embodiments of the disclosure includes: a processor; a memory for storing a computer program executable by the processor; and a transmission device. The processor is configured to run the computer program to:

determine transmission time corresponding to a first channel as a first moment, wherein a BWP activated by the terminal presently is a first BWP;

control the transmission device to receive first control information from a network device, wherein the first control information includes first indication information, and the first indication information is to indicate that a to-be-activated BWP is a second BWP; and control the transmission device to transmit no first channel at the first moment when the first BWP and the second BWP meet a predetermined rule.

BRIEF DESCRIPTION OF THE DRAWINGS

The accompanying drawings are described here to provide a further understanding of the disclosure, and form a part of the disclosure. The schematic embodiments of the disclosure and description thereof are used to explain the disclosure, and do not intended to limit the disclosure. In the drawings.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

As the switchover of the BWP may cause Radio Frequency (RF) retuning of the terminal, the terminal can receive or transmit a signal in a new BWP upon the completion of the RF retuning. According to solutions in a related art, as long as an activated BWP is switched, it is assumed that the terminal will perform the RF retuning and the terminal does not receive or transmit the signal in the new BWP during the RF retuning. In some cases, data or important signaling that should be received and transmitted cannot be received and transmitted timely, so that the transmission reliability is reduced, and the spectral efficiency is lowered.

Figure 1:
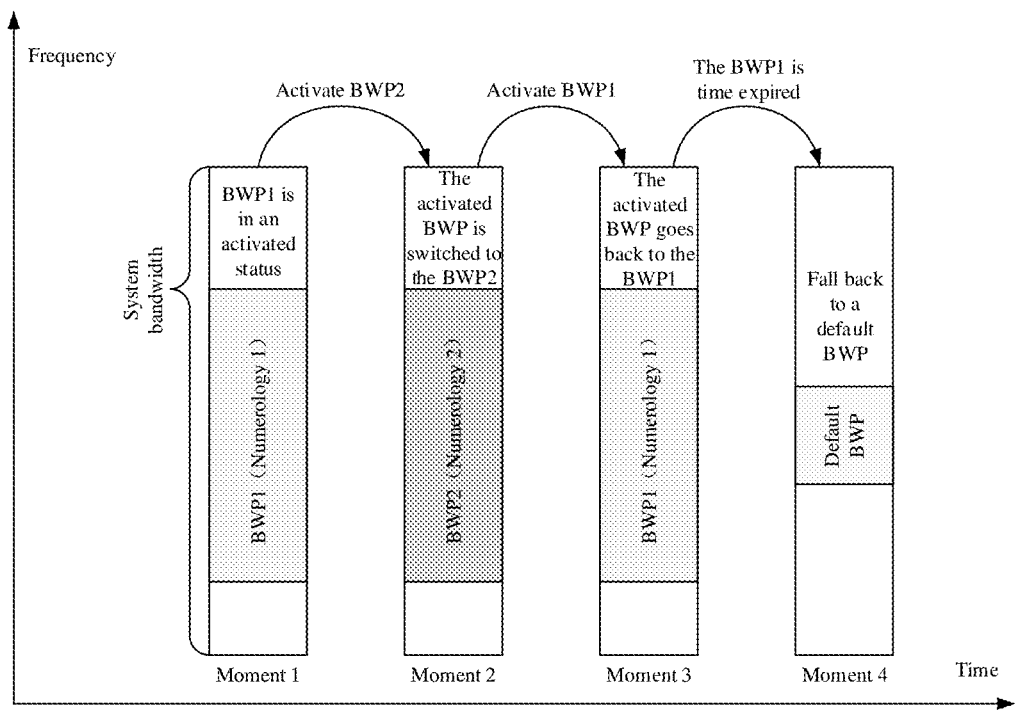
FIG. 1 is a schematic diagram showing that only one BWP can be in an activated status.
Figure 2:
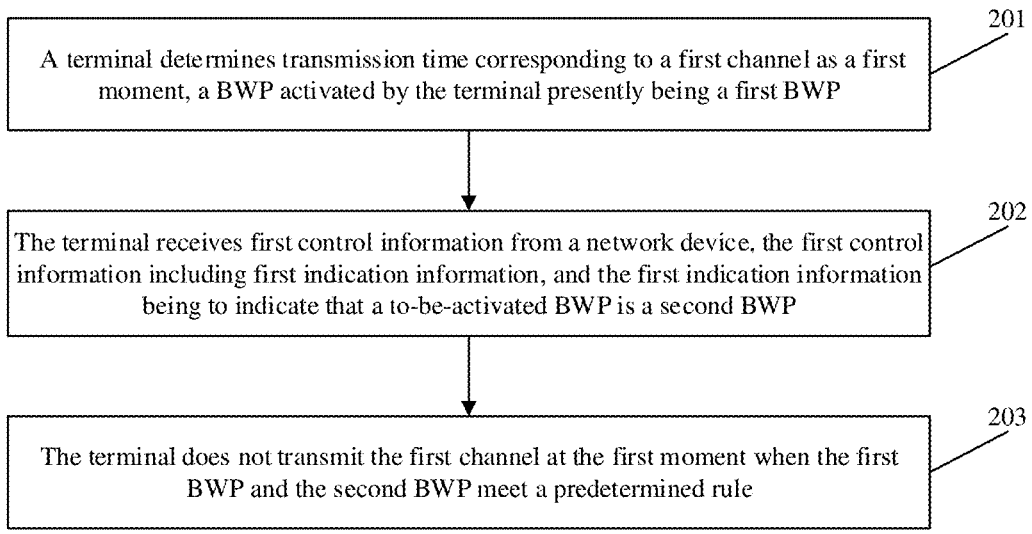
FIG. 2 is a first flowchart schematic diagram of a channel transmission method according to an embodiment of the disclosure.

FIG. 2 is a first flowchart schematic diagram of a channel transmission method according to an embodiment of the disclosure. As shown in FIG. 2, the channel transmission method includes the following operations.

At block 201, a terminal determines transmission time corresponding to a first channel as a first moment, a BWP activated by the terminal presently being a first BWP.

In the embodiment of the disclosure, the terminal may be any device capable of communicating with a network such as a mobile phone, a tablet computer, a notebook and a desktop computer.

In the embodiment of the disclosure, the network device may be a base station, such as a gNB in a 5G system.

In an implementation, the terminal determines, as per a configuration or scheduling from the network device, the transmission time corresponding to the first channel as the first moment. That is, according to the configuration or the scheduling from the network device, the terminal should transmit the first channel at the first moment.

At block 202, the terminal receives first control information from a network device. The first control information includes first indication information, and the first indication information is used for indicating that a to-be-activated BWP is a second BWP.

In an implementation, the terminal receives, at a second moment before the first moment, the first control information transmitted by the network device. For example, the terminal receives the first control information at a t1 moment, and is anticipated to transmit the first channel at a t2 moment (later than the t1 moment). At this time, if RF retuning needs to be performed for switchover between the first BWP and the second BWP, the first channel may not be transmitted at the t2 moment. If the RF retuning does not need to be performed for the switchover between the first BWP and the second BWP, the second BWP may be directly utilized to transmit a message in response to receiving the first control information, and in such a case, the first channel may be transmitted at the t2 moment.

The first channel is not limited in the embodiment of the disclosure. The first channel may be any type of channel or signal, for example, a Physical Downlink Control Channel (PDCCH), or a Physical Downlink Shared Channel (PDSCH), or a Physical Uplink Control Channel (PUCCH), or a Physical Uplink Shared Channel (PUSCH), or a Physical Random Access Channel (PRACH), or a Channel State Information-Reference Signal (CSI-RS), or a Sounding Reference Signal (SRS).

In an implementation, the first control information is DCI or a Media Access Control Control Element (MAC CE).

At block 203, the terminal does not transmit the first channel at the first moment upon a condition that the first BWP and the second BWP meet a predetermined rule.

In the embodiment of the disclosure, the terminal transmits the first channel at the first moment if the first BWP and the second BWP do not meet the predetermined rule.

In the embodiment of the disclosure, the predetermined rule includes at least one of the followings.

A central frequency point of the first BWP is not consistent with a central frequency point of the second BWP.

A bandwidth size of the first BWP is not consistent with a bandwidth size of the second BWP.

A frequency domain range of the second BWP exceeds a frequency domain range of the second BWP.

An RF bandwidth capacity of the terminal cannot simultaneously cover the frequency domain range of the first BWP and the frequency domain range of the second BWP.

In the embodiment of the disclosure, if the first BWP and the second BWP only have different numerologies and are consistent in the central frequency point and the bandwidth size, or the frequency domain range of the second BWP is within the frequency domain range of the first BWP, the terminal does not need to perform the RF retuning. Upon this, 1) the terminal directly activates the second BWP and deactivates the first BWP in response to receiving the first control information if the first BWP and the second BWP do not meet the predetermined rule; and 2) the terminal performs the RF retuning in response to receiving the first control information if the first BWP and the second BWP meet the predetermined rule, so that an activated BWP is switched from the first BWP to the second BWP.

In the technical solutions provided by the embodiments of the disclosure, a terminal determines transmission time corresponding to a first channel as a first moment, a BWP activated by the terminal presently is a first BWP; the terminal receives first control information from a network device, the first control information includes first indication information, and the first indication information is to indicate that a to-be-activated BWP is a second BWP; and the terminal does not transmit the first channel at the first moment if the first BWP and the second BWP meet a predetermined rule. With the technical solutions in the embodiments of the disclosure, when the terminal switches from the first BWP to the second BWP, whether the terminal needs to perform RF retuning is determined according to the predetermined rule, thereby determining whether the terminal may transmit a signal within a new BWP in a BWP switching process. Therefore, an unnecessary BWP switching interval is prevented, and the transmission reliability and the spectral efficiency are improved.

Figure 3:
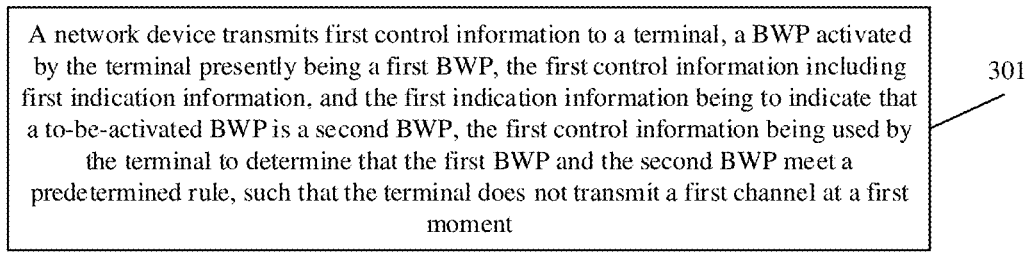
FIG. 3 is a second flowchart schematic diagram of a channel transmission method according to an embodiment of the disclosure.

FIG. 3 is a second flowchart schematic diagram of a channel transmission method according to an embodiment of the disclosure. As shown in FIG. 3, the channel transmission method includes the following operations.

At block 301, a network device transmits first control information to a terminal. A BWP activated by the terminal presently is a first BWP. The first control information includes first indication information, and the first indication information is used for indicating that a to-be-activated BWP is a second BWP. The first control information is used by the terminal to determine that the first BWP and the second BWP meet a predetermined rule, such that the terminal does not transmit a first channel at a first moment.

In an implementation, the first control information is further used by the terminal to determine that the first BWP and the second BWP do not meet the predetermined rule, such that the terminal transmits the first channel at the first moment.

In an implementation, the first control information is further used by the terminal to determine that the first BWP and the second BWP do not meet the predetermined rule, such that the terminal directly activates the second BWP and deactivates the first BWP in response to receiving the first control information.

In an implementation, the first control information is further used by the terminal to determine that the first BWP and the second BWP meet the predetermined rule, such that the terminal performs RF retuning in response to receiving the first control information, to switch an activated BWP from the first BWP to the second BWP.

In an implementation, the predetermined rule includes at least one of the followings.

A central frequency point of the first BWP is not consistent with a central frequency point of the second BWP.

A bandwidth size of the first BWP is not consistent with a bandwidth size of the second BWP.

A frequency domain range of the second BWP exceeds a frequency domain range of the second BWP.

An RF bandwidth capacity of the terminal cannot simultaneously cover the frequency domain range of the first BWP and the frequency domain range of the second BWP.

In an implementation, the network device configures or schedules the transmission time corresponding to the first channel as the first moment for the terminal.

In an implementation, the network device transmits the first control information to the terminal at a second moment before the first moment.

In an implementation, the first channel is a PDCCH, or a PDSCH, or a PUCCH, or a PUSCH, or a PRACH, or a CSI-RS, or an SRS.

In an implementation, the first control information is DCI or an MAC CE.

The technical solutions of the disclosure are further described below in combination with specific application examples.

Figure 4:
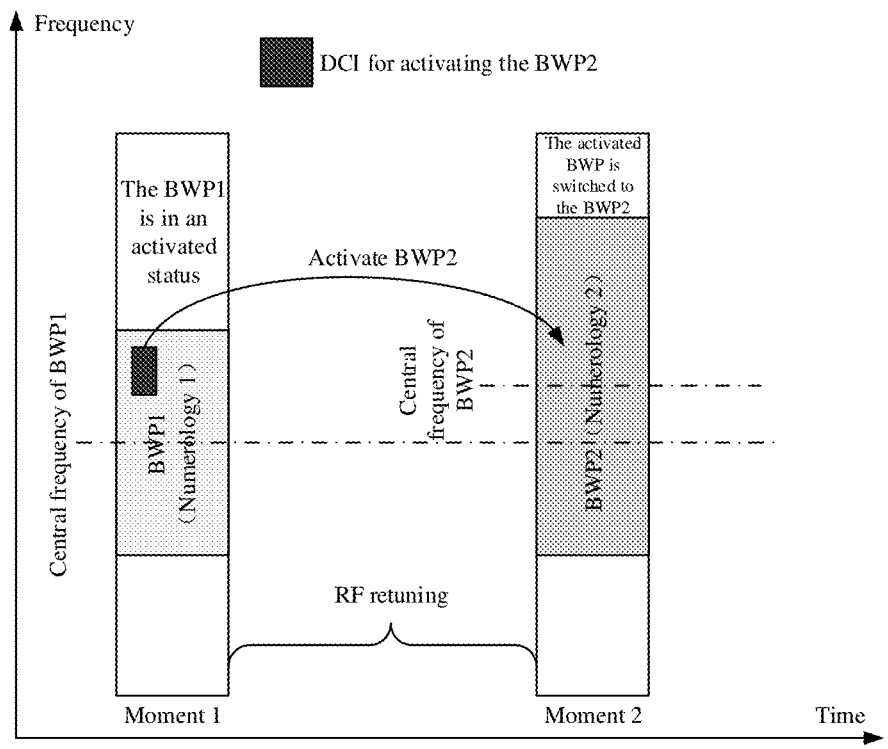
FIG. 4 is a schematic diagram showing that a BWP1 is not consistent with a BWP2 in central frequency point and bandwidth size, and a terminal needs to switch a BWP with RF retuning, according to an embodiment of the disclosure.

Example 1: a BWP1 is not consistent with a BWP2 in central frequency point and bandwidth size, and a terminal needs to switch a BWP with RF retuning As shown in FIG. 4, the BWP1 is not consistent with the BWP2 in central frequency point and bandwidth size. The terminal needs to perform RF retuning in response to receiving DCI (first control information) for activating the BWP2 and cannot start to use the BWP2 until the completion of the RF tuning. During the RF tuning, the terminal cannot transmit a channel on the BWP2.

Figure 5:
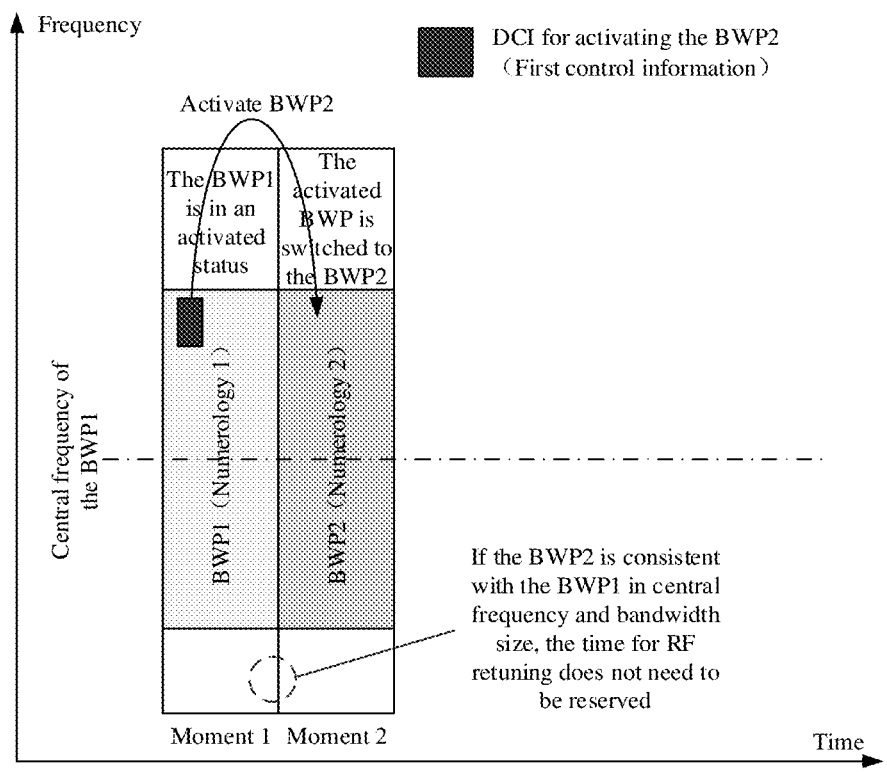
FIG. 5 is a schematic diagram showing that a BWP1 is consistent with a BWP2 in central frequency point and bandwidth size, and a terminal can switch a BWP without RF retuning, according to an embodiment of the disclosure.

Example 2: a BWP1 is consistent with a BWP2 in central frequency point and bandwidth size, and a terminal may switch a BWP without RF retuning As shown in FIG. 5, the BWP1 is consistent with the BWP2 in central frequency point and bandwidth size. The terminal does not need to perform the RF retuning, and may immediately start to use the BWP2 to transmit the first channel in response to receiving DCI (first control information) for activating the BWP2.

According to the technical solutions of the embodiments of the disclosure, when the terminal switches from the BWP1 to the BWP2, whether the terminal needs to perform the RF retuning is determined according to the predetermined rule, thereby determining whether the terminal may transmit a signal within a new BWP (i.e., the BWP2) in a BWP switching process. Therefore, an unnecessary BWP switching interval is prevented, and the transmission reliability and the spectral efficiency are improved.

Figure 6:
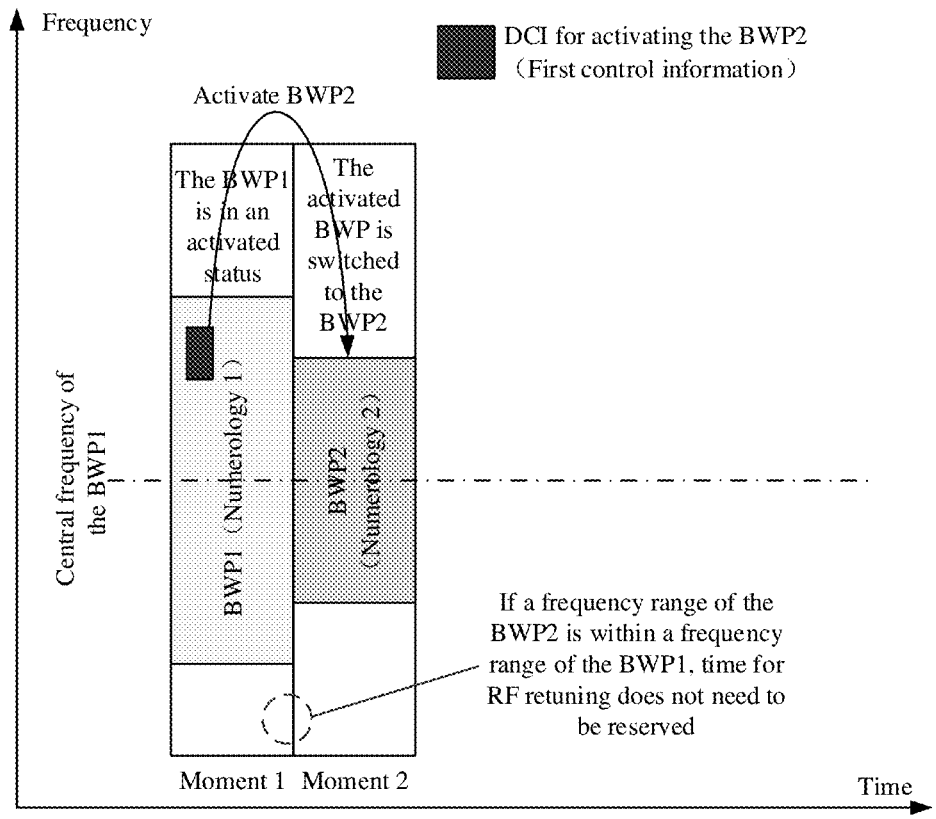
FIG. 6 is a schematic diagram showing that a frequency range of a BWP2 is within a frequency range of a BWP1, and a terminal can switch a BWP without RF retuning, according to an embodiment of the disclosure.

Example 3: a frequency range of a BWP2 is within a frequency range of a BWP1, and a terminal may switch a BWP without RF retuning As shown in FIG. 6, the frequency range of the BWP2 is within the frequency range of the BWP1. The terminal does not need to perform the RF retuning, and may immediately start to use the BWP2 to transmit the first channel in response to receiving DCI (first control information) for activating the BWP2.

According to the technical solutions of the embodiments of the disclosure, when the terminal switches from the BWP1 to the BWP2, whether the terminal needs to perform the RF retuning is determined according to the predetermined rule, thereby determining whether the terminal may transmit a signal within a new BWP (i.e., the BWP2) in a BWP switching process. Therefore, an unnecessary BWP switching interval is prevented, and the transmission reliability and the spectral efficiency are improved.

Figure 7:
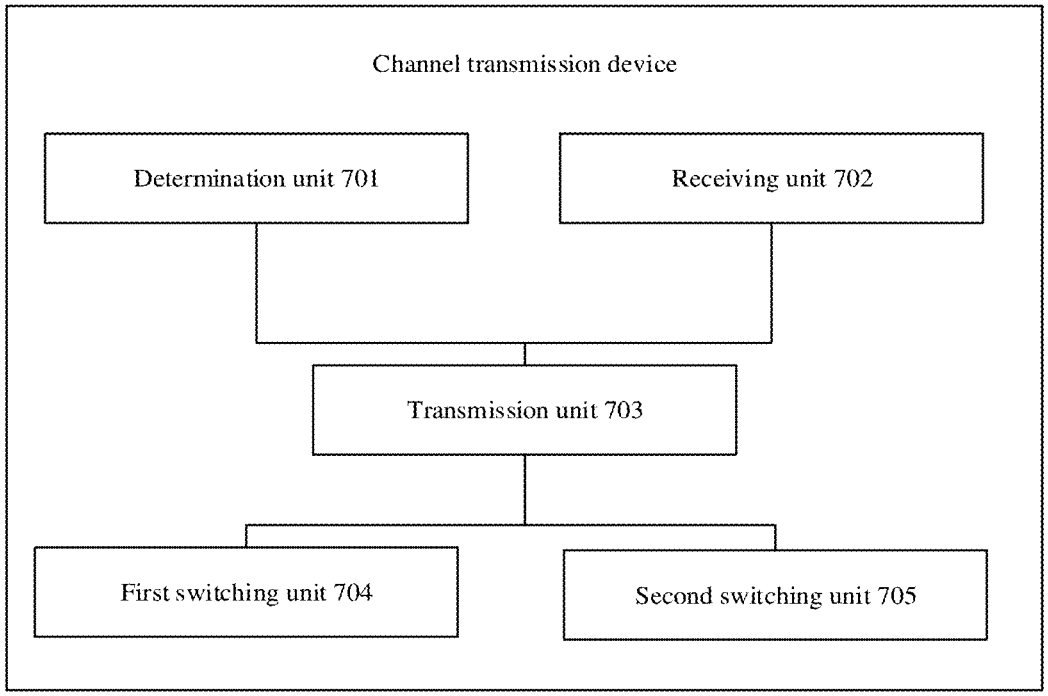
FIG. 7 is a first structural schematic diagram of a channel transmission device according to an embodiment of the disclosure.

FIG. 7 is a first structural schematic diagram of a channel transmission device according to an embodiment of the disclosure. As shown in FIG. 7, the channel transmission device includes: a determination unit 701, a receiving unit 702 and a transmission unit 703.

The determination unit 701 is configured to determine transmission time corresponding to a first channel as a first moment. A BWP activated by the terminal presently is a first BWP.

The receiving unit 702 is configured to receive first control information from a network device. The first control information includes first indication information, and the first indication information is used for indicating that a to-be-activated BWP is a second BWP.

The transmission unit 703 is configured to not transmit the first channel at the first moment upon a condition that the first BWP and the second BWP meet a predetermined rule.

In an implementation, the transmission unit 703 is further configured to transmit the first channel at the first moment upon a condition that the first BWP and the second BWP do not meet the predetermined rule.

In an implementation, the device further includes a first switching unit 704.

The first switching unit 704 is configured to, if the first BWP and the second BWP do not meet the predetermined rule, directly activate the second BWP and deactivate the first BWP in response to receiving the first control information.

In an implementation, the device further includes a second switching unit 705.

The second switching unit 705 is configured to, if the first BWP and the second BWP meet the predetermined rule, perform RF retuning in response to receiving the first control information, so that an activated BWP is switched from the first BWP to the second BWP.

In an implementation, the predetermined rule includes at least one of the followings.

A central frequency point of the first BWP is not consistent with a central frequency point of the second BWP.

A bandwidth size of the first BWP is not consistent with a bandwidth size of the second BWP.

A frequency domain range of the second BWP exceeds a frequency domain range of the second BWP.

An RF bandwidth capacity of the terminal cannot simultaneously cover the frequency domain range of the first BWP and the frequency domain range of the second BWP.

In an implementation, the determination unit 701 is configured to determine, as per a configuration or scheduling from the network device, the transmission time corresponding to the first channel as the first moment.

In an implementation, the receiving unit 702 is configured to receive, at a second moment before the first moment, the first control information transmitted by the network device.

In an implementation, the first channel is a PDCCH, or a PDSCH, or a PUCCH, or a PUSCH, or a PRACH, or a CSI-RS, or an SRS.

In an implementation, the first control information is DCI or an MAC CE.

Those skilled in the art will appreciate that functions implemented by each unit in the resource transmission device shown in FIG. 7 may be understood with reference to related descriptions about the channel transmission method. The functions of each unit in the channel transmission device shown in FIG. 7 may be implemented through a program running in a processor, and may also be implemented through a specific logical circuit.

Figure 8:
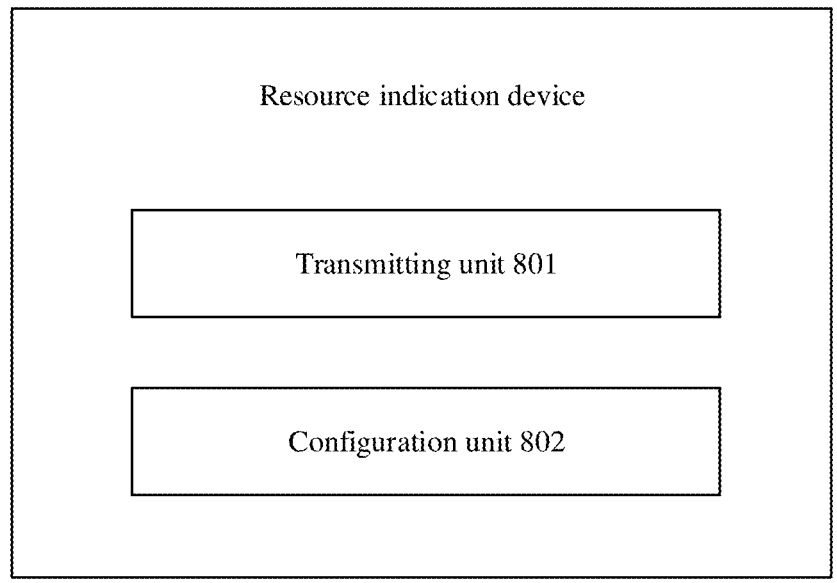
FIG. 8 is a second structural schematic diagram of a channel transmission device according to an embodiment of the disclosure.

FIG. 8 is a second structural schematic diagram of a channel transmission device according to an embodiment of the disclosure. As shown in FIG. 8, the channel transmission device includes a transmitting unit 801.

The transmitting unit 801 is configured to transmit first control information to a terminal. A BWP activated by the terminal presently is a first BWP. The first control information includes first indication information, and the first indication information is used for indicating that a to-be-activated BWP is a second BWP. The first control information is used by the terminal to determine that the first BWP and the second BWP meet a predetermined rule, such that the terminal does not transmit a first channel at a first moment.

In an implementation, the first control information is further used by the terminal to determine that the first BWP and the second BWP do not meet the predetermined rule, such that the terminal transmits the first channel at the first moment.

In an implementation, the first control information is further used by the terminal to determine that the first BWP and the second BWP do not meet the predetermined rule, such that the terminal directly activates the second BWP and deactivates the first BWP in response to receiving the first control information.

In an implementation, the first control information is further used by the terminal to determine that the first BWP and the second BWP meet the predetermined rule, such that the terminal performs RF retuning in response to receiving the first control information, to switch an activated BWP from the first BWP to the second BWP.

In an implementation, the predetermined rule includes at least one of the followings.

A central frequency point of the first BWP is not consistent with a central frequency point of the second BWP.

A bandwidth size of the first BWP is not consistent with a bandwidth size of the second BWP.

A frequency domain range of the second BWP exceeds a frequency domain range of the second BWP.

An RF bandwidth capacity of the terminal cannot simultaneously cover the frequency domain range of the first BWP and the frequency domain range of the second BWP.

In an implementation, the device further includes a configuration unit 802.

The configuration unit 802 is configured to configure or schedule the transmission time corresponding to the first channel as the first moment for the terminal.

In an implementation, the transmitting unit 801 is configured to transmit the first control information to the terminal at a second moment before the first moment.

In an implementation, the first channel is a PDCCH, or a PDSCH, or a PUCCH, or a PUSCH, or a PRACH, or a CSI-RS, or an SRS.

In an implementation, the first control information is DCI or an MAC CE.

Those skilled in the art will appreciate that functions implemented by each unit in the resource transmission device shown in FIG. 8 may be understood with reference to related descriptions about the channel transmission method. The functions of each unit in the channel transmission device shown in FIG. 8 may be implemented through a program running in a processor, and may also be implemented through a specific logical circuit.

When being implemented in form of software functional module and sold or used as an independent product, the channel transmission device in the embodiments of the disclosure may also be stored in a computer-readable storage medium. Based on such an understanding, the technical solutions in the embodiments of the disclosure substantially or parts making contributions to the conventional art may be embodied in form of software product, and the computer software product is stored in a storage medium, including a plurality of instructions used to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium having stored therein computer-executable instructions that, when being executed by a processor, cause the processor to implement the channel transmission method in the embodiments of the disclosure.

Figure 9:
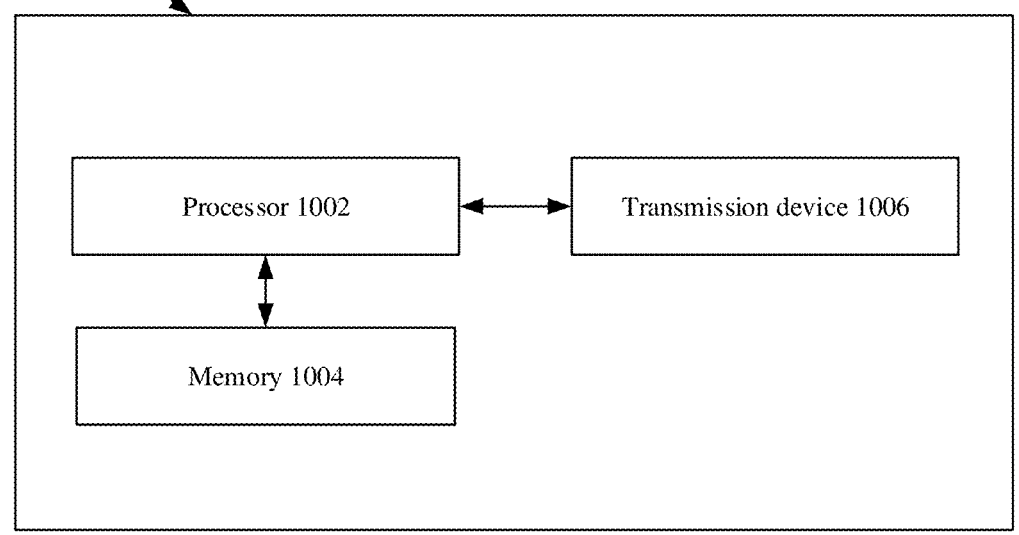
FIG. 9 is a structural schematic diagram of a computer device according to an embodiment of the disclosure.

FIG. 9 is a structural schematic diagram of a computer device according to an embodiment of the disclosure. The computer device may be a terminal, and may also be a network device. As shown in FIG. 9, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 for storing data and a transmission device 1006 configured for a communication function. Those of ordinary skill in the art will appreciate that the structure shown in FIG. 9 is only schematic and not intended to limit the structure of the electronic device. For example, the computer device 100 may further include components more or fewer than the components shown in FIG. 9 or has a configuration different from that shown in FIG. 9.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the above-mentioned method. The memory 1004 may include a high-speed random access memory and may also include a non-volatile memory, for example, one or more magnetic storage devices, flash memories or other non-volatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network or a combination thereof.

The transmission device 1006 is configured to receive or transmit data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recited in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions in the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

Described above are only specific embodiments of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A channel transmission method, comprising:
   determining, by a terminal, transmission time corresponding to a first channel as a first moment, wherein a Band Width Part (BWP) activated by the terminal presently is a first BWP;
   receiving, by the terminal, first control information from a network device, wherein the first control information comprises first indication information, and the first indication information is to indicate that a to-be-activated BWP is a second BWP;
   transmitting, by the terminal, no first channel at the first moment when the first BWP and the second BWP meet a predetermined rule; and
   directly activating, by the terminal, the second BWP and deactivating the first BWP without performing Radio Frequency (RF) retuning in response to receiving the first control information when the first BWP and the second BWP do not meet the predetermined rule, and transmitting, by the terminal, the first channel at the first moment by using the second BWP.

2. The channel transmission method of claim 1, further comprising:
   performing, by the terminal, the RF retuning in response to receiving the first control information when the first BWP and the second BWP meet the predetermined rule, so that an activated BWP is switched from the first BWP to the second BWP.

3. The channel transmission method of claim 1, wherein the predetermined rule comprises at least one of the following:
   a central frequency point of the first BWP is not consistent with a central frequency point of the second BWP;
   a bandwidth size of the first BWP is not consistent with a bandwidth size of the second BWP;
   a frequency domain range of the second BWP exceeds a frequency domain range of the first BWP; or
   an RF bandwidth capacity of the terminal cannot simultaneously cover the frequency domain range of the first BWP and the frequency domain range of the second BWP.

4. The channel transmission method of claim 1, wherein determining, by the terminal, the transmission time corresponding to the first channel as the first moment comprises:
   determining, by the terminal, as per a configuration or scheduling from the network device, the transmission time corresponding to the first channel as the first moment.

5. The channel transmission method of claim 1, wherein receiving, by the terminal, the first control information from the network device comprises:
   receiving, by the terminal, at a second moment before the first moment, the first control information from the network device.

6. The channel transmission method of claim 1, wherein the first channel is a Physical Downlink Control Channel (PDCCH), or a Physical Downlink Shared Channel (PDSCH), or a Physical Uplink Control Channel (PUCCH), or a Physical Uplink Shared Channel (PUSCH), or a Physical Random Access Channel (PRACH), or a Channel State Information-Reference Signal (CSI-RS), or a Sounding Reference Signal (SRS).

7. A channel transmission method, comprising:
   transmitting, by a network device, first control information to a terminal, wherein a Band Width Part (BWP) activated by the terminal presently is a first BWP, the first control information comprises first indication information, the first indication information is to indicate that a to-be-activated BWP is a second BWP, wherein the first control information is used by the terminal to determine whether the first BWP and the second BWP meet a predetermined rule or not, such that the terminal does not transmit a first channel at a first moment when the first BWP and the second BWP meet the predetermined rule; and wherein the first control information is used by the terminal to directly activate the second BWP and deactivate the first BWP without performing Radio Frequency (RF) retuning when the first BWP and the second BWP do not meet the predetermined rule, and
   receiving, by the network device, the first channel transmitted at the first moment by using the second BWP.

8. The channel transmission method of claim 7, wherein the predetermined rule comprises at least one of the following:
   a central frequency point of the first BWP is not consistent with a central frequency point of the second BWP;
   a bandwidth size of the first BWP is not consistent with a bandwidth size of the second BWP;
   a frequency domain range of the second BWP exceeds a frequency domain range of the first BWP; or
   an RF bandwidth capacity of the terminal cannot simultaneously cover the frequency domain range of the first BWP and the frequency domain range of the second BWP.

9. The channel transmission method of claim 6, further comprising:
    configuring or scheduling, by the network device, the transmission time corresponding to the first channel as the first moment for the terminal.

10. The channel transmission method of claim 7, wherein transmitting, by the network device, the first control information to the terminal comprises:
    transmitting, by the network device, the first control information to the terminal at a second moment before the first moment.

11. A channel transmission device, comprising:
    a processor;
    a memory for storing a computer program executable by the processor; and
    a transmission device,
    wherein the processor is configured to run the computer program to:
    determine transmission time corresponding to a first channel as a first moment, wherein a Band Width Part (BWP) activated by the channel transmission device presently is a first BWP;
    control the transmission device to receive first control information from a network device, wherein the first control information comprises first indication information, and the first indication information is to indicate that a to-be-activated BWP is a second BWP;
    control the transmission device to transmit no first channel at the first moment when the first BWP and the second BWP meet a predetermined rule; and
    directly activate the second BWP and deactivate the first BWP without performing Radio Frequency (RF) retuning in response to receiving the first control information when the first BWP and the second BWP do not meet the predetermined rule, and transmit the first channel at the first moment by using the second BWP.

12. The channel transmission device of claim 11, wherein the processor is further configured to:
    perform the RF retuning in response to receiving the first control information when the first BWP and the second BWP meet the predetermined rule, so that an activated BWP is switched from the first BWP to the second BWP.

13. The channel transmission device of claim 11, wherein the predetermined rule comprises at least one of the following:
    a central frequency point of the first BWP is not consistent with a central frequency point of the second BWP;
    a bandwidth size of the first BWP is not consistent with a bandwidth size of the second BWP;
    a frequency domain range of the second BWP exceeds a frequency domain range of the first BWP; or
    an RF bandwidth capacity of the channel transmission device cannot simultaneously cover the frequency domain range of the first BWP and the frequency domain range of the second BWP.

14. The channel transmission device of claim 11, wherein the processor is configured to determine, as per a configuration or scheduling from the network device, the transmission time corresponding to the first channel as the first moment.

15. The channel transmission device of claim 11, wherein the processor is further configured to control the transmission device to receive, at a second moment before the first moment, the first control information from the network device.

16. The channel transmission device of claim 11, wherein the first control information is Downlink Control Information (DCI) or a Media Access Control Control Element (MAC CE).

* * * * *